June 27, 1961  R. C. FISCHER  2,990,121
MOBILE IRRIGATION APPARATUS
Filed Oct. 20, 1958  2 Sheets-Sheet 2
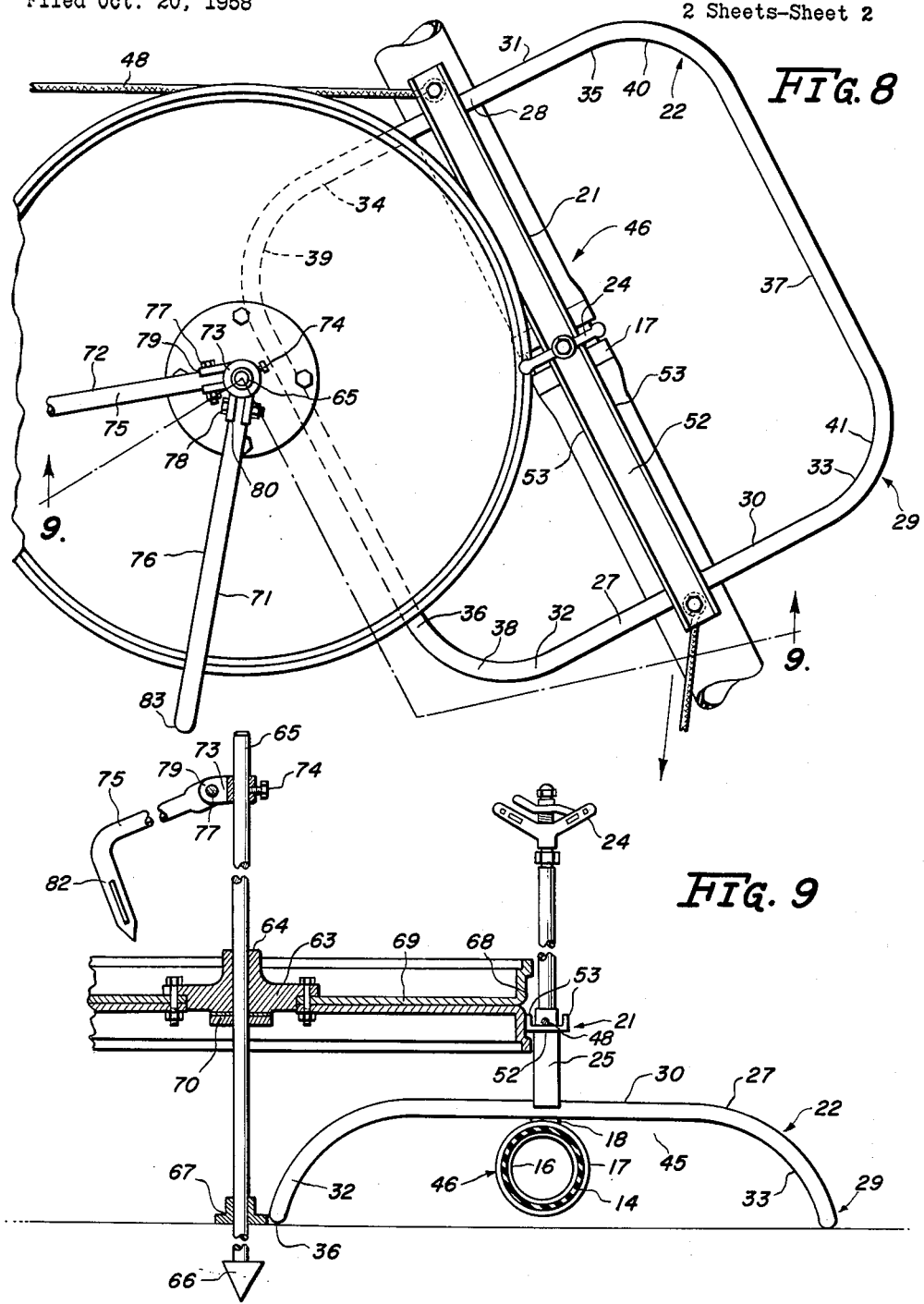
INVENTOR
Raymond C. Fischer
Paul O. Pippel
ATTORNEY

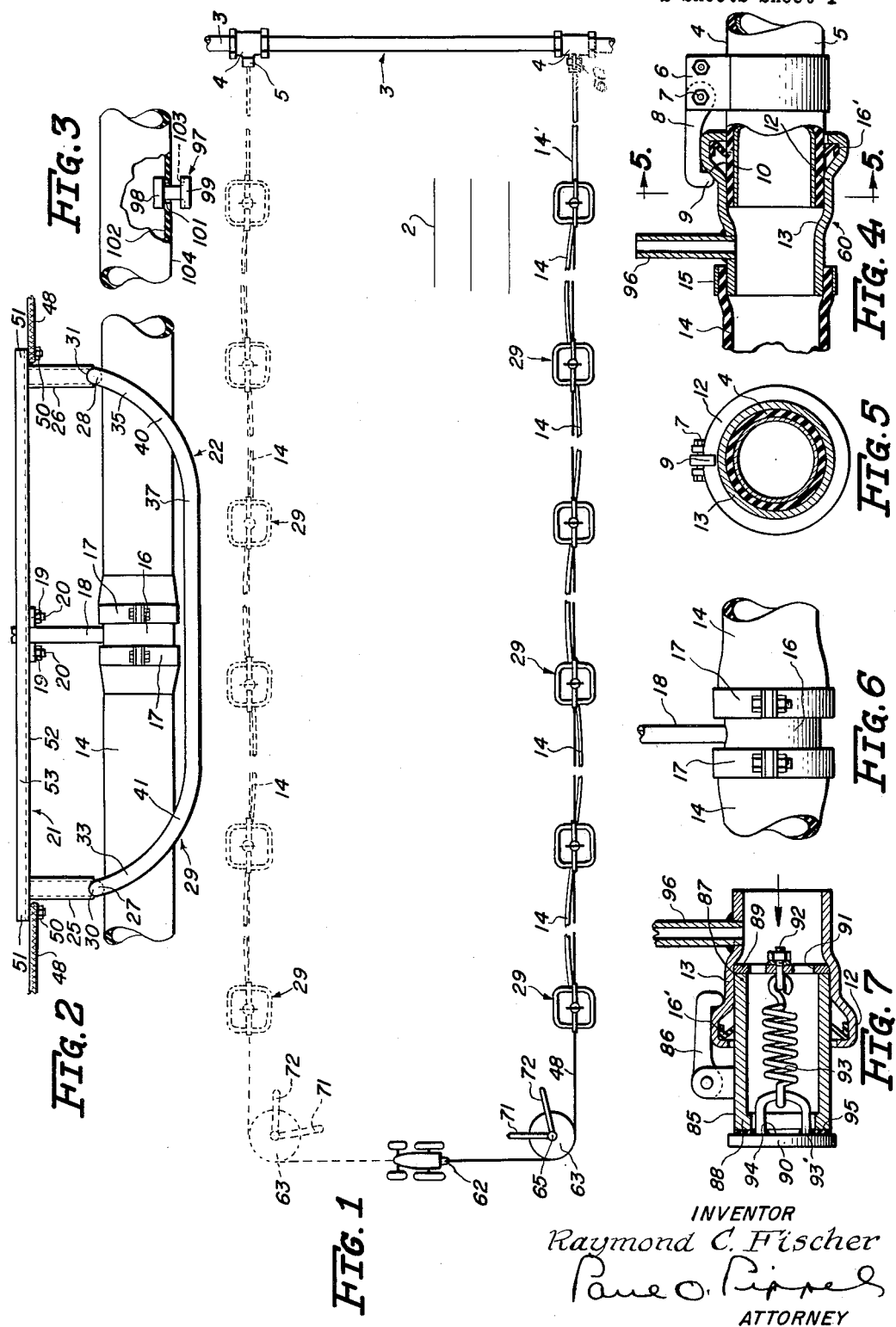

United States Patent Office 2,990,121
Patented June 27, 1961

2,990,121
MOBILE IRRIGATION APPARATUS
Raymond C. Fischer, Hinsdale, Ill., assignor to International Harvester Company, Chicago, Ill., a corporation of New Jersey
Filed Oct. 20, 1958, Ser. No. 768,446
4 Claims. (Cl. 239—213)

This invention relates to sprinkler apparatus and more specifically to a novel portable apparatus which may be easily transported and set up for field irrigation particularly where cultivated crops are concerned.

One of the most time-consuming, arduous and crop damaging tasks is in shifting or moving sprinkler apparatus. Frequently labor problems preclude extensive use of such equipment because of unavailability or because the work is so exhausting that one or two shifts a day is more than a laborer could perform. Furthermore, for efficient use the sprinkler apparatus discharges water in all directions and the laborer must of necessity wade into the mud and in carrying the unwieldy equipment tramples and destroys a considerable amount of the crop.

A general object of the invention is to provide a novel flexible sprinkling apparatus wherein the equipment may be set up on the dry ground and then after irrigation dragged off by a tractor, the apparatus being guided between the plants so as to minimize damage.

A more specific object of the invention is to provide a novel flexible sprinkler apparatus wherein the individual sprinkler unit is mounted on skids and the entire assemblage being interconnected by a flexible cable guided around guides in the form of pulleys and the like so that the assemblage may be snaked through a field with minimum disturbance to the plants.

These and other objects of the invention become more apparent from the specifications and drawings, wherein:

FIGURE 1 is a plan view partially broken apart and partially diagrammatic illustrating the invention as laid in a field of crops;

FIGURE 2 is a side elevational view of one of the sprinkler head supporting skids including a sprinkler head and conduit fragmentarily shown;

FIGURE 3 is a fragmentary side elevational view of the conduit with a drain plug arrangement shown in section;

FIGURE 4 is an axial sectional view of a quick-attaching coupling;

FIGURE 5 is a transverse sectional view taken substantially on the line 5—5 of FIGURE 4;

FIGURE 6 is a fragmentary side elevational view of a coupling attachment for a pair of hose sections;

FIGURE 7 is an axial sectional view of the relief valve structure;

FIGURE 8 is a fragmentary plan view of the sprinkler and skid showing its traverse about a guide anchor in the form of a pulley wheel, and FIGURE 9 is a fragmentary vertical sectional view partially broken apart of the structure shown in FIGURE 8 taken substantially on the line 9—9 of FIGURE 8.

Describing the invention in detail and having particular reference to the drawings there is shown in FIGURE 1 a schematic arrangement of a portion of a field the lines 2 representing rows of crops arranged in a conventional rectangular pattern. A main conduit 3 is laid in the field along one side thereof which in the present instance is shown as more or less a permanent installation although it will be understood that it may also be dismantled and moved to other locations as will be obvious from the structure. Main conduit 3 may have a plurality of couplings 4 spaced at suitable intervals and each coupling 4 may comprise a male pipe stub 5 mounting a clamp 6 which provides an attachment for a bolt 7 which pivots one end of a hook 8, the hook 8 having a hook end 9 which engages behind a shoulder 10 on a bell-shaped annulus 12 formed on one end of the female coupling member 13 which may be telescoped into a suitable hose section 14 and clamped thereto as by a hoop band 15. The interior of the bell portion 12 may be provided with a self-sealing ring 16.

The hose section 14 may have its free end sleeved over a nipple which in turn is telescoped into the adjacent end of another hose section 14. The hose sections 14 are clamped to the nipples 16' by means of a pair of hoop type clamp members 17. The nipple 16 is connected to a riser 18 in the form of a pipe and communicates therewith and the pipe 18 adjacent to its lower end is connected with outstanding ears 19 which are suitably secured by means of nut and bolt assemblies 20 to a longitudinal top member 21 of a skid or support structure designated 22. The riser 18 terminates its upper end a considerable distance above the skid in a conventional sprinkler head 24 which is powered by the pressure of the water passing through the conduit and the riser, the head 24 rotating and sprinkling a considerable area.

The skid 22 as seen in FIGURES 2, 8 and 9 comprises a pair of dependent posts 25 and 26 at opposite ends of the member 21 and weld-connected thereto, the lower ends of the members 25 and 26 being weld-connected to front and rear transverse structures 27 and 28 respectively of the skid frame 29. As best seen in FIGURE 9 the front and rear members 27 and 28 are in the form of an inverted U and comprise upper bight portions 30 and 31 which at opposite ends merge into arcuately downwardly curved legs 32, 33, and 34 and 35 respectively, the lower ends of the legs 32, 34 merging into opposite ends of a ground-engaging longitudinal runner 36 and the legs 33, 35 merged at their lower ends into the runner 37 which parallel the runner 36. When viewed from the top it will be seen that the frame work 29 is substantially rectangular and that the legs merge into the runners in broad curved corners 38, 39, 40, 41 so as not to present any sharp obtrusions to the advance of the skid across a muddy field. Thus the frame 29 is generally concave-convex with the concave side opened downwardly and providing a pocket or space at 45 for the conduit structure generally designated 46 which is constituted as flexible pipe sections 14 and the intervening couplings.

The skids 22 are flexibly interconnected by means of flexible preferably steel cable lengths or sections 48 which may be connected at opposite ends as by bolts 50 to the adjacent ends 51 of the top member 21 of the skid. It will be seen that the hose sections 14 between the adjacent skids is relatively slack and has a greater length than the cable section 48 so that when the entire assembly of skids which are interconnected by the cable links or flexible draft means 48 are drawn by a tractor as shown in FIGURE 1 all the load is imposed through the skids and the flexible member and not through the conduits and thus the conduit may be made of relatively weak material inasmuch as it is not load sustaining.

As best seen in FIGURES 8 and 9 the member 21 in addition to serving as a support for the riser in the sprinkler head also serves as a guide and track member and is therefore preferably formed as a channel having a bottom wall 52 and a pair of generallly parallel upright guide flanges 53.

As best seen in FIGURE 1 in order to properly locate the flexible sprinkler array and in setting up the system the releasable coupling generally designated 60 is coupled by inserting the member 13 over the stub 5 and latching the hook 8 over the bell flange 12. The tractor which is connected to the initial cable link 48 as at 62 moves through the field along a row of plants and drags the sprinkler system in back thereof and thus the skids with their individual risers each follow one another as best seen in FIGURE 1 until the tractor reaches the end of the field. At the corner of the field there is positioned and anchored a guide structure in the form of a sheave 63 which is spindled as at 64 on a combination anchor and shaft 65 which may have a pointed lower end 66 and a stop 67 intermediate its ends, the stop 67 being disposed in such position that its distance from the sheave approximates that of the distance of the track member 21 with respect to the ground so that the track member 21 as well as the cable links which are drawn taut as the tractor is drawing the assemblage in the field will track about the groove 68 in the wheel pulley 69. The height of the pulley 69 is maintained by the shoulder or seat member 70 which is secured rigidly to the shaft 65. In addition to the anchor member 65 there are provided a pair of angularly related braces 71 and 72 which include a sleeve 73 to which the braces 72 and 73 at adjacent ends are connected, mounted on the shaft 65 and fastened thereto by the locking bolt 74. It will be seen that the members 71 and 72 have generally horizontal portions 75, 76 respectively which as their adjacent ends are pivoted in generally horizontal axes by bolts 77 and 78 to the ear structures 79 and 80 formed integral with the sleeve 73. The portions 75 and 76 overlie the pulley wheel and outwardly of the pulley wheel merge into downwardly extending anchor members 82 and 83 respectively which have lower pointed ends by means at which the anchor members are driven into the ground, said anchor members serving to resist the lateral thrust developed by movement of the sprinkler assemblage thereabout.

It will be appreciated that the hose is not in any way wrapped around the pulleys and is of such length between the adjacent skids that it does not carry the load except that it is of course self-sustaining. It will be seen that a pulley structure is disposed at each turn or corner. As shown in FIGURE 1 the first end of the sprinkler may be drawn between the plant rows so that it extends to the main 3.

In order to insure against breakage of the hose due to over pressure, the coupling member 13 which is disposed at the free end of the conduit structure is associated with a relief valve, said valve comprising a tubular member 85 which extends into the bell 13 and is sealed by the ring 16'. The tube 85 is provided with a hook latch 86 which is swung behind the annulus or shoulder structure 12 for holding the relief valve in place. The inner and outer ends 87 and 88 of tube 85 are clamped or engaged by disks 89 and 90, the disk 89 being perforated to provide openings 91 therethrough and having an anchor 92 fastened thereto in the nature of an eye bolt centrally thereof securing one end of a tension spring 93 of predetermined load magnitude. The other end of the spring is hooked around an eye 93' which is connected to the inner side 94 of the closure plate 90, the side 94 being drawn against a sealing ring 95 which is provided on the outer edge 88 of the pipe link 85. It will be readily realized that if the pressure is excessive the valve spring 93 will expand and permit the cap 90 to unseat and discharge the water.

It will be seen that each coupling member 13 may be provided with a riser 96 which may have a sprinkler head mounted thereon.

In order to lighten the assembly when it is necessary to move it around and after it had been used and loaded with water, I provide at several strategic places a self-sealing plug which is generally designated 97 (FIG. 3) which has an inner and outer head 98 and 99 with an inner connecting shank which passes through a discharge aperture 101, the head 98 abutting with the inner side or the bottom 102 on the interior of the tube and the head 99 being disposed exteriorly. When there is sufficient pressure in the sytem the head 98 will be urged outwardly against the surface 102 and seal the opening 101. Only when the pressure is released the operator may open the unit 94 or it may be made of material such as rubber so that it would be self-sealing when pressure builds up and unplug when pressure is relieved and discharge the water over the head 99 which may be slotted as at 103 in order to permit the water to flow out and not cause the head 99 to seal against the exterior 104 of the conduit.

It will be understood that after turning off the water, the hose to the first skid may be removed and this end of the lateral capped with an extra plug 97. Thus the operator goes to the other end, and moves the lateral, hooking up to the main with hose 14'.

I claim:

1. A sprinkler type irrigation system comprising a plurality of skids, a cable interconnecting adjacent skids, sprinkler means mounted individually upon the several skids, flexible hose extending between adjacent skids and connected to respective sprinkler means, said hose having means at one end for connection to a supply of water, guide means adapted to be anchored in the field to be irrigated, means for connecting said cable to a tractor or the like, said cable adapted to be drawn taut to space the sprinkler means a maximum distance apart and to be slack to space the sprinkler means less than said distance with attendant bending of said hose, said cable adapted to be trained about said guide means as said tractor drags the same with the skids therebehind for guiding said system in the field about said guide means, said skids having rigid portions of limited longitudinal extent engaging the guide means.

2. A sprinkler type of irrigation apparatus comprising a plurality of spaced skids aligned in a row, flexible draft means interconnecting the skids, sprinkler means supported on each of said skids, flexible conduit means operatively connected to said sprinkler means and supported from the skids, each skid having a rigid guide member, guide means mounted in the field for engagement by said flexible means as said apparatus is dragged across a field for guiding the same, said guide member of each skid and said guide means guidably engaging each other as the skid is drawn past the guide means and said draft and conduit means bending about said guide means.

3. In an apparatus of the class described, an ambulatory sprinkler support and guide structure comprising a pair of inverted U-shaped end elements presenting a top bight portion and downwardly and outwardly extending legs, runners interconnecting the legs at the respective sides of the skid, said legs and respective runners merging in broadly curved leading and trailing corners, a longitudinal combination support and guide track member interconnecting said bight portions intermediate their ends, said end elements with said runners and guide member forming a downwardly open pocket, flexible conduit means carried from said guide member between said runners and in normal position spaced from the ground and serving as additional support upon said runners digging into the ground, a riser with a sprinkler head carried by the guide member, and flexible cable lengths connected to opposite ends of the guide member.

4. An irrigation apparatus comprising a plurality of skids aligned in a row, sprinkler means mounted on the skids including a flexible conduit running the length of the row and a sprinkler head carried on each skid, and flexible cable means interconnecting adjacent skids to each other and having a length at the leading end of the row for connection to an associated tractive vehicle, said skids adapted to be spaced a distance less than the maximum length of the cable means between the skids with attendant bending of the conduit, and guide means mounted in a field, and comprising an anchor structure and a pulley rotatable on a generally horizontal axis and providing a peripheral groove and said apparatus having said cable means trained about the pulley in the groove therein for guidance thereby as the same is drawn across a field.

References Cited in the file of this patent

UNITED STATES PATENTS

| | | |
|---|---|---|
| 2,678,844 | Hondeville | May 18, 1954 |
| 2,741,510 | McCulloch | Apr. 10, 1956 |
| 2,796,292 | Maggart | June 18, 1957 |
| 2,803,498 | Touton | Aug. 20, 1957 |
| 2,834,634 | Johnson | May 13, 1958 |